United States Patent [19]

Shepard

[11] Patent Number: 4,572,962
[45] Date of Patent: Feb. 25, 1986

[54] APPARATUS FOR EXTRACTING ENERGY FROM WINDS AT HIGH ALTITUDES

[75] Inventor: David H. Shepard, Rye, N.Y.

[73] Assignee: Cognitronics Corporation, Stamford, Conn.

[21] Appl. No.: 372,632

[22] Filed: Apr. 28, 1982

[51] Int. Cl.$^4$ .............................................. F03D 3/02
[52] U.S. Cl. ...................................... 290/55; 290/44; 416/7
[58] Field of Search .................. 290/44, 55; 416/7, 8, 416/84–86; 415/5, 7; 244/153 A, 20

[56] References Cited

U.S. PATENT DOCUMENTS

| | | | |
|---|---|---|---|
| 3,924,827 | 12/1975 | Lois | 290/55 |
| 3,987,987 | 10/1976 | Payne et al. | 290/44 |
| 4,049,300 | 9/1977 | Schneider | 290/54 |
| 4,084,102 | 4/1978 | Fry et al. | 290/55 |
| 4,113,205 | 9/1978 | Shaw | 416/7 |
| 4,186,314 | 1/1980 | Diggs | 290/55 |
| 4,309,006 | 1/1982 | Biscomb | 290/55 |

FOREIGN PATENT DOCUMENTS

| | | | |
|---|---|---|---|
| 501402 | 4/1954 | United Kingdom | 244/20 |
| 1546467 | 5/1979 | United Kingdom | |
| 2049831 | 12/1980 | United Kingdom | 416/142 B |

Primary Examiner—William M. Shoop, Jr.
Assistant Examiner—W. E. Duncanson, Jr.
Attorney, Agent, or Firm—Parmelee, Bollinger & Bramblett

[57] ABSTRACT

A wind-operated power-generating module for operation at high altitudes such as 1000 meters comprising a frame structure mounting a pair of vertically-separated parallel shafts around which pass endless belts supporting a series of parallel, elongate wing-like elements for movement around a closed path including the parallel shafts. Wind flow drives these elements around the closed path, to enable electrical power to be generated, and also provides lift to hold the module up at the appropriate high altitude. A number of such modules are tethered in fixed positions in the sky, and are controllable as is appropriate to accommodate changing wind conditions.

21 Claims, 11 Drawing Figures

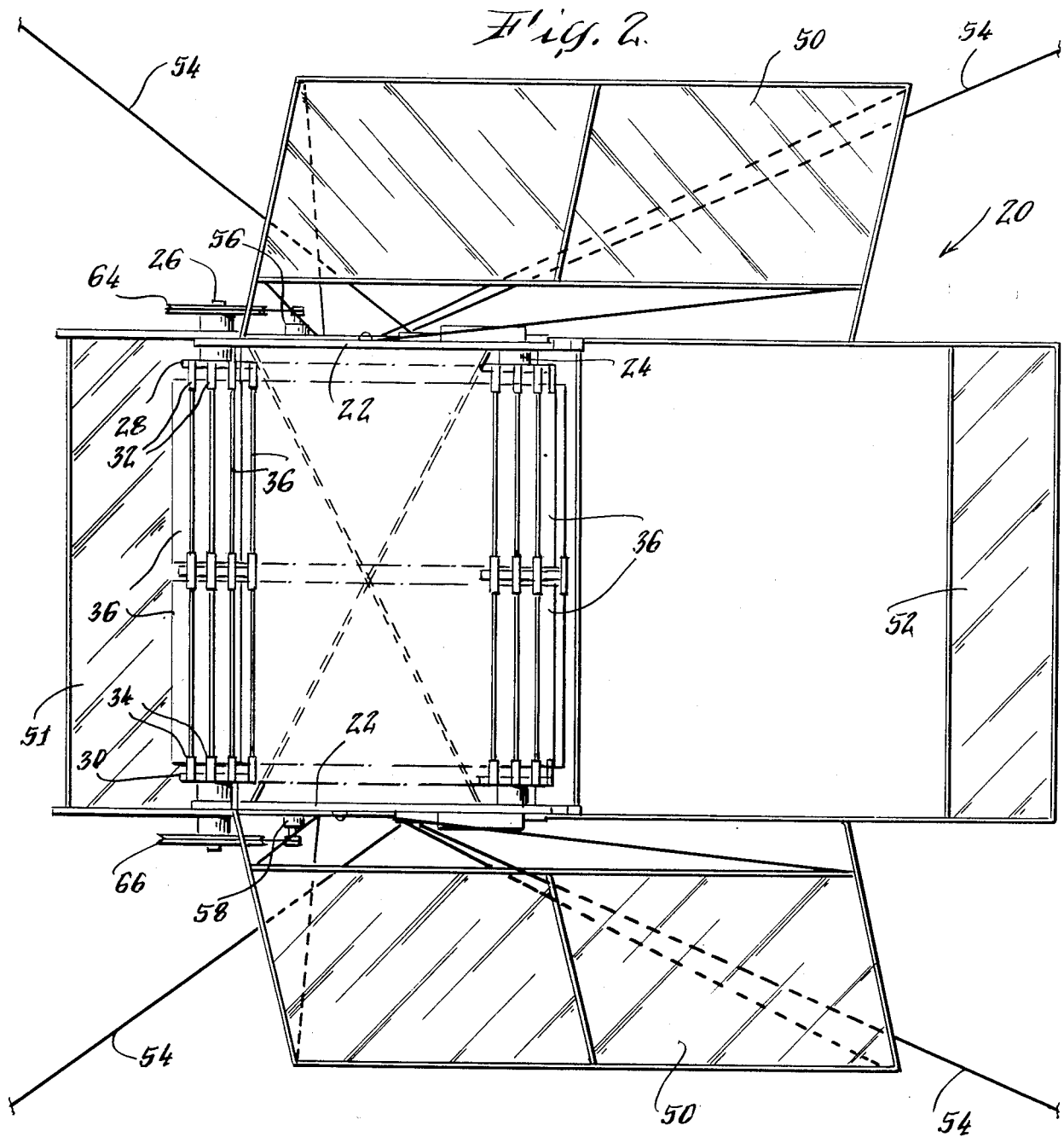

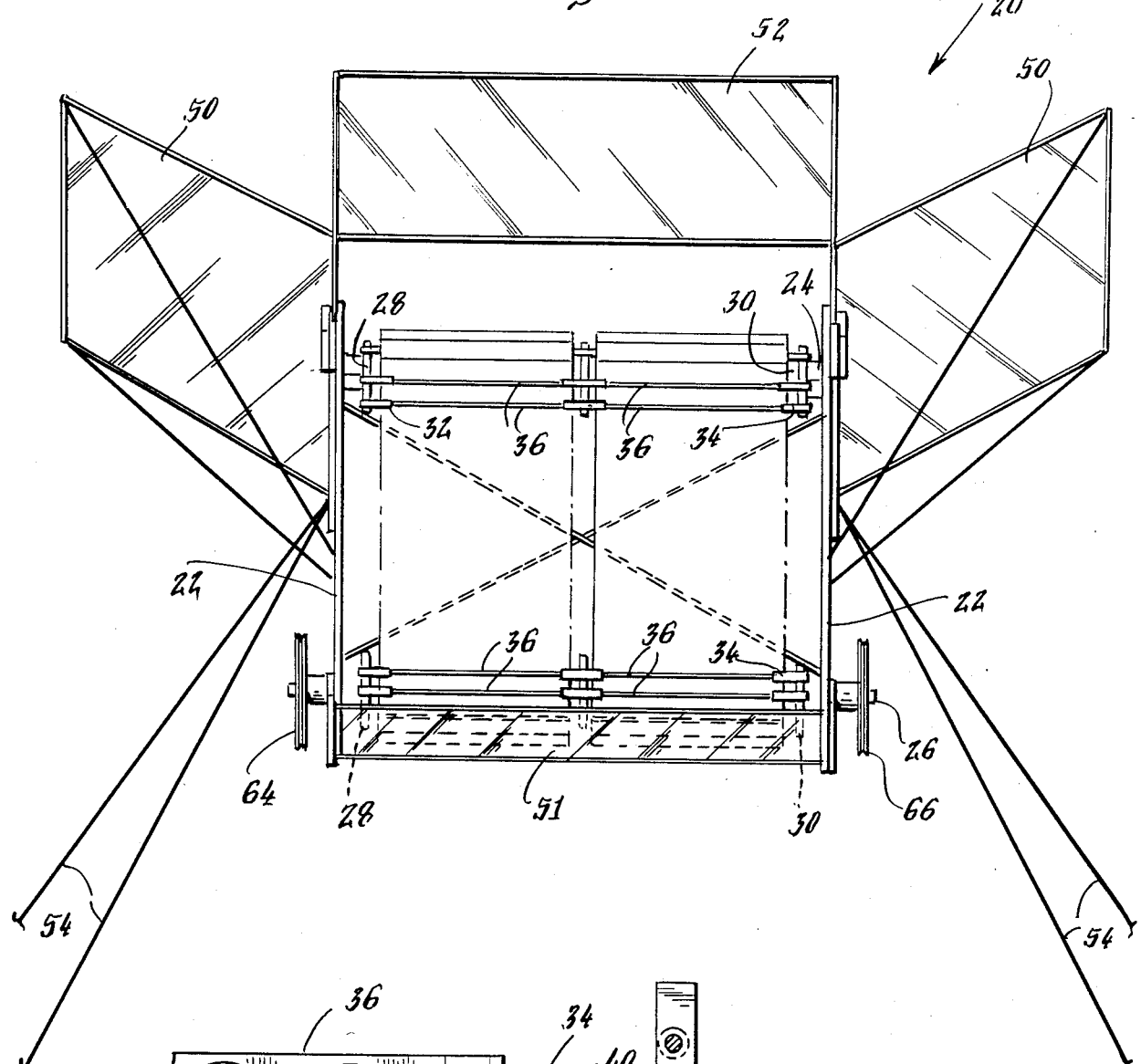
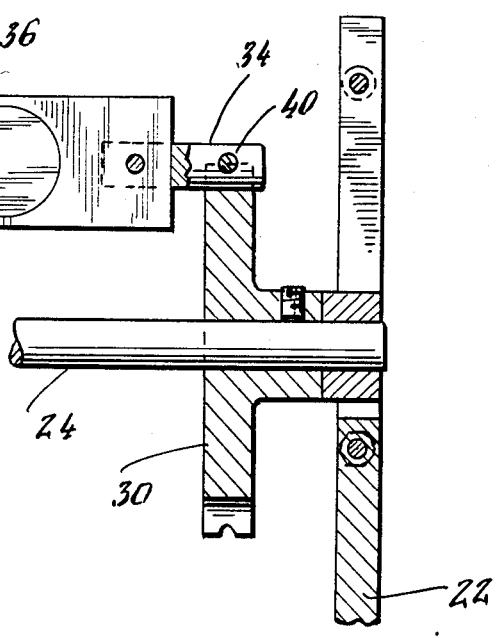

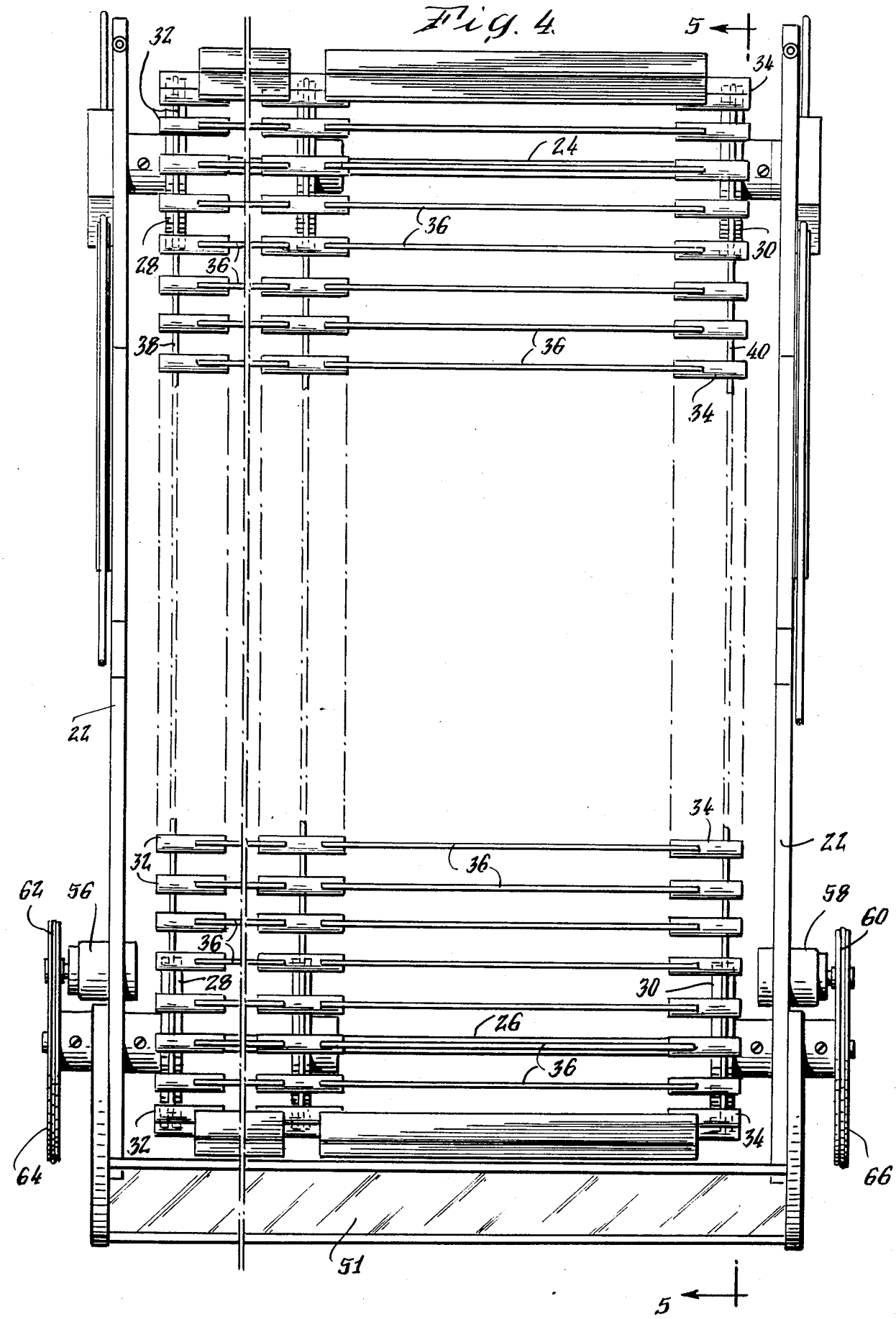

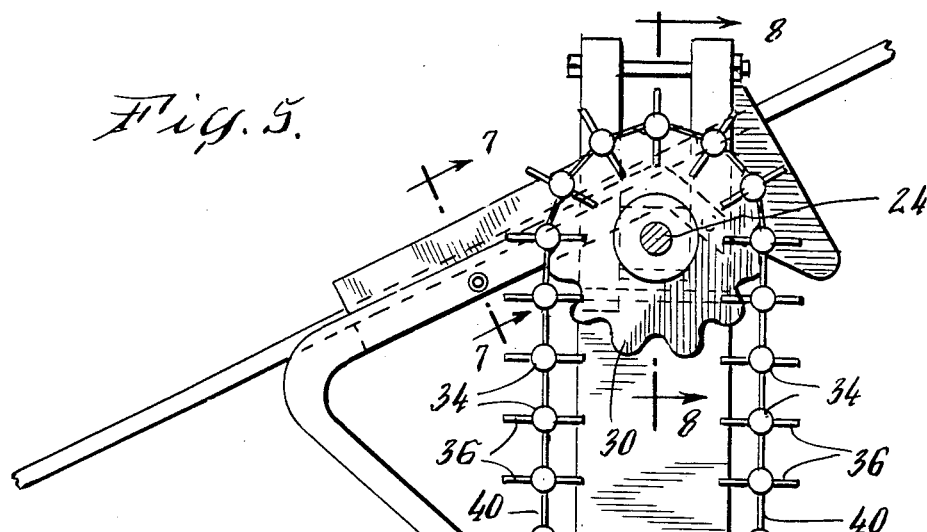
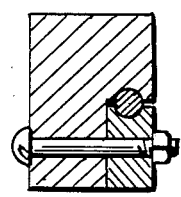
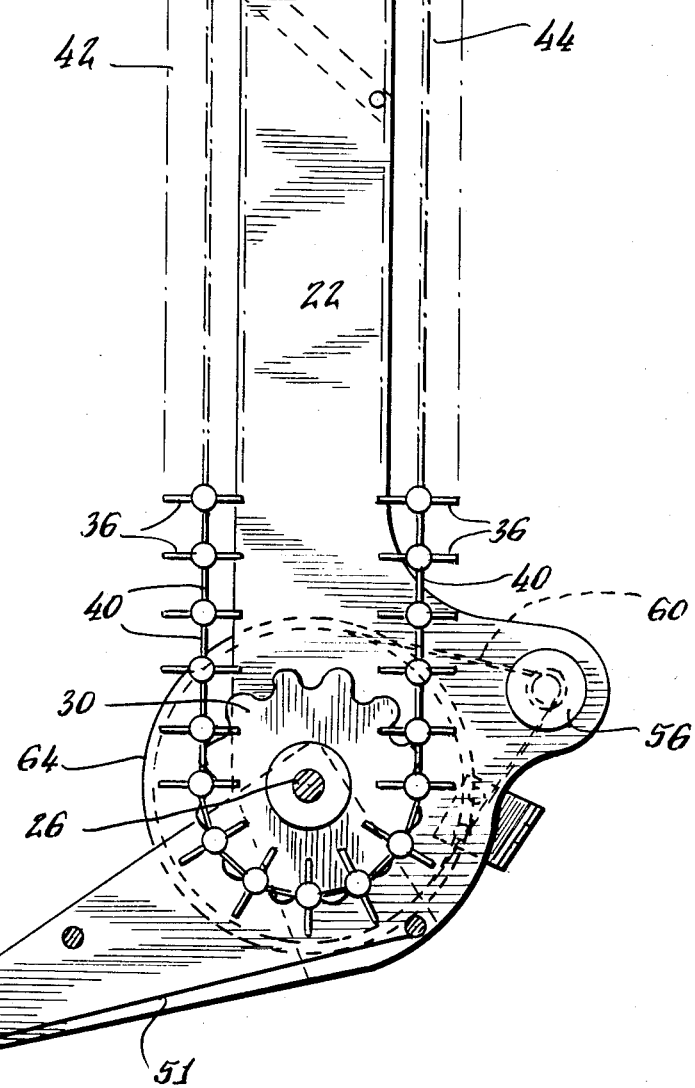
Fig. 5.
Fig. 7.

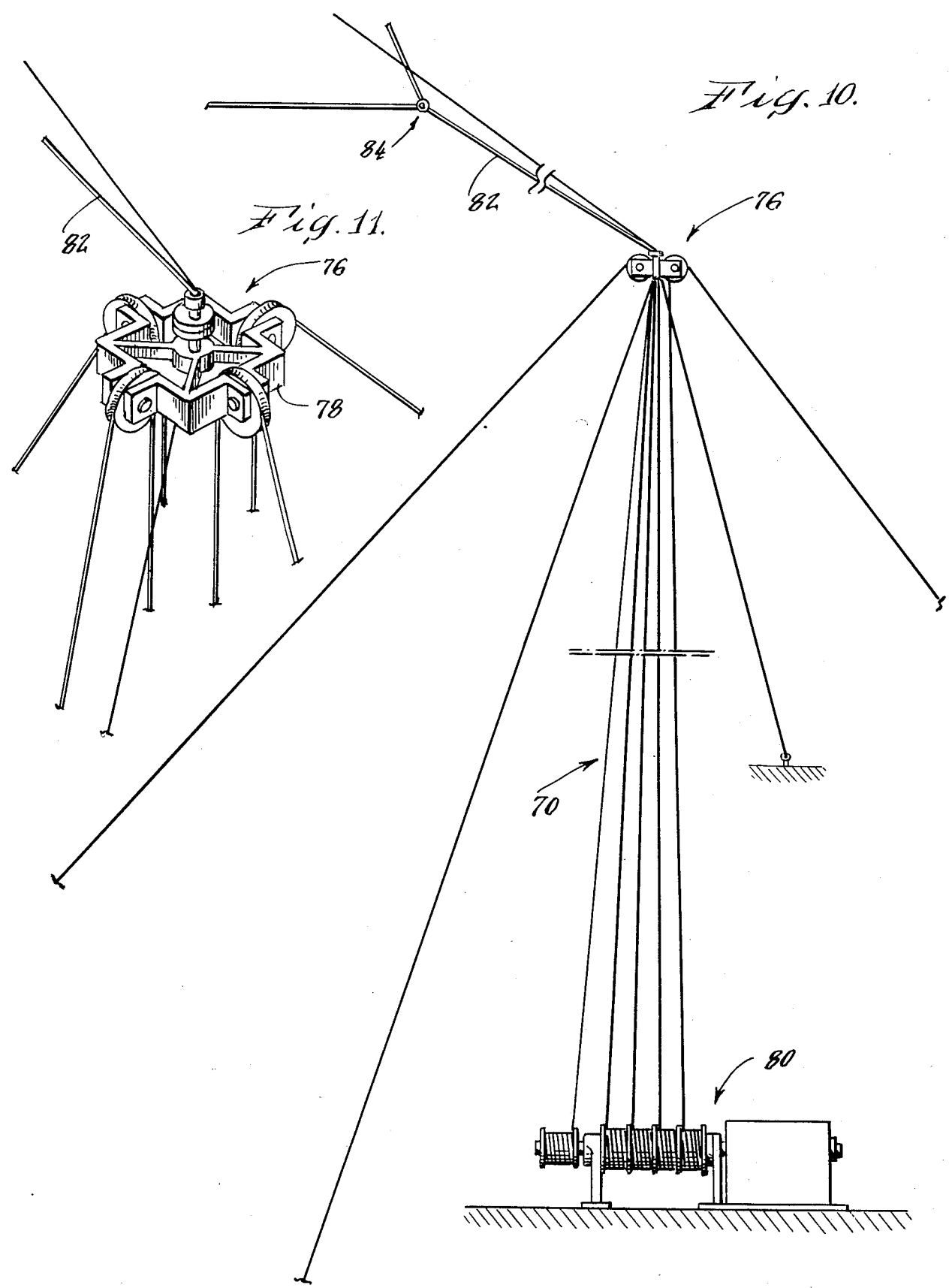

APPARATUS FOR EXTRACTING ENERGY FROM WINDS AT HIGH ALTITUDES

BACKGROUND OF THE INVENTION

1. Field of the Invention

This invention relates to apparatus and methods for extracting substantial electrical power from the wind. More particularly, this invention relates to extracting power from winds at relatively high altitudes, e.g. a thousand meters above the surface of the earth.

2. Prior Art

A wide variety of approaches have been devised for generating electricity from the wind. Windmills have been used fairly extensively, but have so far been economically competitive only in special situations such as remote and/or exceptionally windy sites. Present commercial wind energy conversion devices utilize primarily blades mounted on a single shaft, most frequently a horizontal shaft mounted on a tower and pointing into the wind.

U.S. Pat. No. 4,049,300 (Schneider) shows a power-producing apparatus comprising two vertically-displaced parallel axles carrying wheels mounting endless belts to which are secured a series of blades movable around a path having ascending and descending legs; fluid (e.g. air) passing through the apparatus develops power in both legs to provide in effect a two-stage cascaded arrangement. Still another approach is disclosed in U.S. Pat. No. 4,302,684 (Gogins) which shows apparatus comprising a very long closed loop track, with parallel sides and round ends, and carrying cars supporting huge vertical sails. Electricity is generated from movement of the cars around the track caused by the wind.

The above prior art arrangements (which represent only a sampling of the available disclosures) are directed essentially to extracting power from winds at ground level. Thus, their performance suffers from the relatively low power density and extreme variability in time and location of ground-level winds.

There have been proposals made for extracting power from winds at high levels, where the velocity is substantially greater than at ground levels. Such an approach is particularly attractive because the energy content of wind goes up as the cube of the wind velocity. One such system is shown in U.S. Pat. No. 3,924,827 (Lois) which discloses a series of buoyant wings connected by tethers to an electric generator. The system is so arranged that as one wing is being retracted, at least one other wing is being drawn away by the wind to deliver power to the generator.

Another proposal for high-altitude wind power extraction is set forth in a paper entitled "Electricity Generation from Jet Stream Wind" by Fletcher and Roberts, appearing in the July-August, 1979 issue of the Journal of Energy of the AIAA. That scheme comprises an airplane-like structure tethered to an essentially single point on the ground and carrying wind turbines driving electric generators which deliver electric current to the ground through two conductors forming part of the tether. The proposal involves flying such a device at extremely high altitudes, e.g. 12 km. At that height, interference could be expected with piloted aircraft (except possibly in the remote part of Australia considered by the authors of the disclosure).

SUMMARY OF THE INVENTION

In one embodiment of the present invention, to be described hereinbelow in detail, a wind-operated power-generating module for operation at relatively high altitudes (such as up to 1000 meters) comprises a frame structure mounting a pair of vertically-separated parallel shafts. Endless belts pass around these shafts and carry a chain of parallel, elongate airfoil elements arranged for movement around a closed path extending perpendicular to the longitudinal axis of the elements and having ascending and descending legs. Interaction between the windward airfoil elements and the wind produces lift to hold the apparatus at the desired altitude, and also drives the elements around the closed path. The rectilinear, as opposed to radial, arrangement of the airfoils permits higher power generation efficiency with respect to the wind area intercepted, especially when operated with linear velocity a multiple of wind speed. The returning, leeward, airfoils are preferably operated in a manner to minimize drag and negative lift. The elements are mechanically coupled to an electric generator producing electric power for transmittal to earth.

The power-generating module is tethered so as to be held in a fixed position in the sky. A large number of modules are so tethered side-by-side to extract power from a wide area. Entanglement and collision between adjacent modules is prevented as a result of the fixed-position tethering. In the event of low or zero wind velocity, the modules are automatically returned to earth at a controlled relatively slow speed made possible by the high ratio of aerodynamic surface to weight. Such modules can be stacked vertically, with provision for retrieval and automatic stowage in the event of low-wind conditions. When satisfactory wind conditions return the modules automatically rise again to substantial altitude.

Other objects, aspects and advantages of the invention will in part be pointed out in, and in part apparent from, the following detailed description of one embodiment of the invention, considered together with the accompanying drawings.

BRIEF DESCRIPTION OF THE DRAWINGS

FIG. 2 is a plan view of the module of FIG. 1;

FIG. 3 is an end elevation view of the module of FIG. 1;

FIG. 4 is a view showing details of the airfoil elements;

FIG. 5 is a cross-section taken along lines 5—5 of FIG. 4;

FIG. 7 is a detail cross-section taken along line 7—7 of FIG. 5;

FIG. 8 is a detail cross-section taken along line 8—8 of FIG. 5;

FIG. 10 is a view providing details of a four-line tether arrangement; and

FIG. 11 illustrates a pulley arrangement for the common junction of the four-line tether.

DETAILED DESCRIPTION

Figure 1:
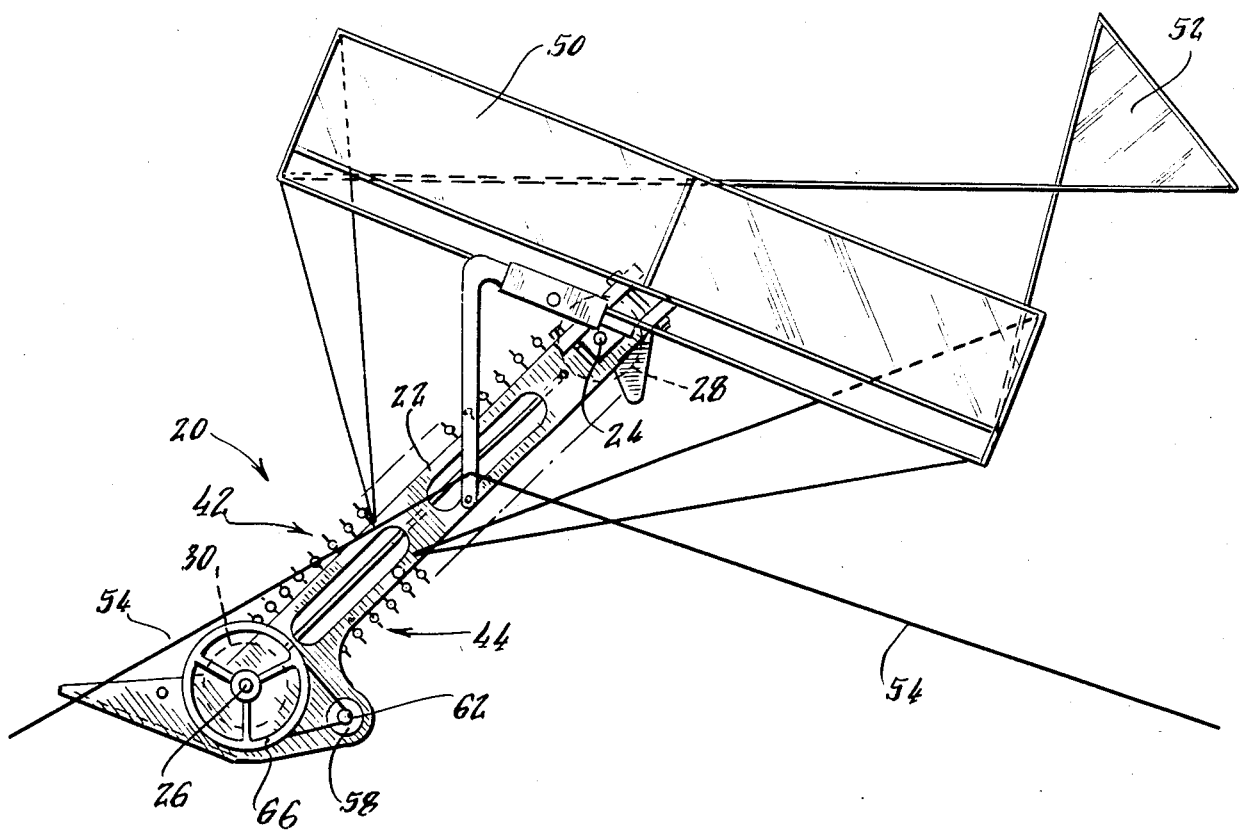
FIG. 1 is a side elevation view of a wind-operated power-generating module in accordance with the present invention.
Figure 6:
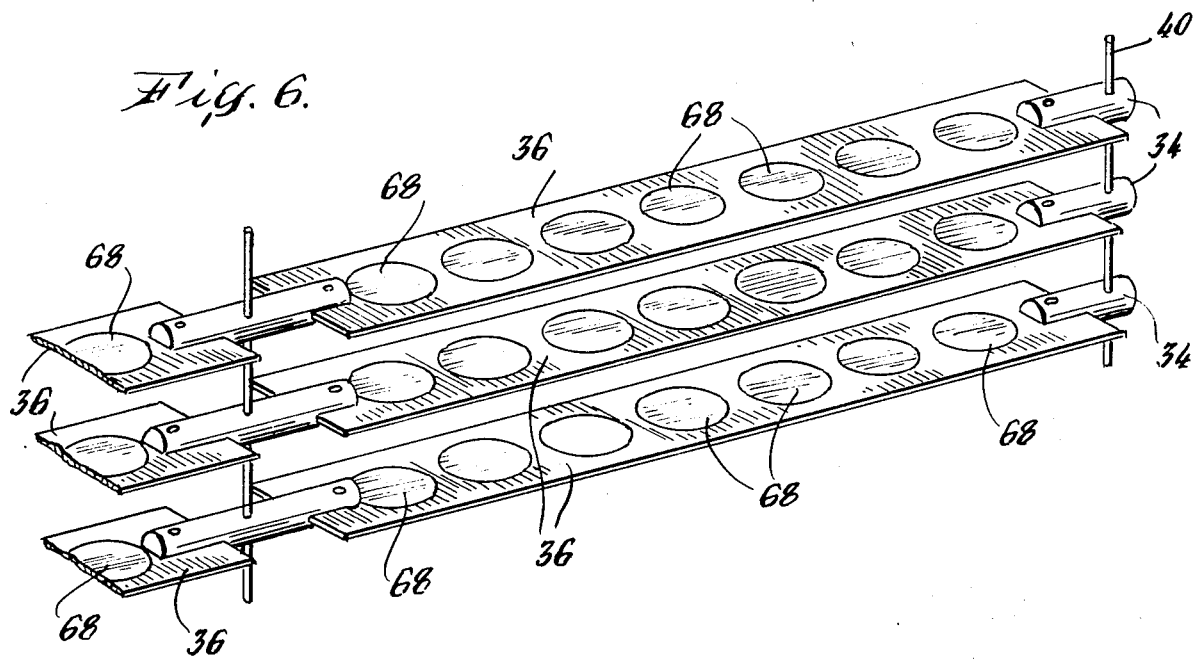
FIG. 6 is a perspective view of a set of the airfoil elements.

Referring now to FIGS. 1 through 4, there is shown a wind-power module generally indicated at 20 and illustrating a design adapted to be flown at relatively high altitudes to produce electrical power from the wind. This module comprises an outer frame 22 on which is rotatably mounted a pair of vertically-offset, horizontal shafts 24, 26. Secured near the ends of each of these shafts, within the sides of the frame 22, are sprocket wheels 28, 30 arranged to engage the ends of sets of corresponding cylindrical studs 32, 34 which are attached to respective elongate wing-like elements 36. The studs are secured to endless belts 38, 40 (see also FIG. 6) at evenly spaced intervals matching the sprocket wheels 28, 30, and support the elements 36 in parallel disposition for movement around a closed path perpendicular to the longitudinal axes of the elements. As seen in FIG. 1, this path has ascending and descending legs 42, 44.

The wing-like elements 36 act as airfoils when the module 20 is positioned in a wind. For example, with the wind flowing from left-to-right in FIG. 1, upwardly-directed forces are developed on the elements of the left-hand leg 42. These upward forces cause the elements to move in unison about the closed path defined by the belts 38, 40. Moreover, these forces produce lift for the entire module, permitting it to be maintained at a predetermined altitude above the earth.

The particular embodiment shown in FIGS. 1 through 4 corresponds to a test model which included additional aerodynamic surfaces in the form of side wings 50, a front piece 51, and a tail 52, to provide additional lift and to aid aerodynamic stability. Such additional surfaces are not however basically required to produce sufficient lift to enable such a module to maintain itself at a selected altitude while still producing power from movement of the elements 36.

In a wind-tunnel test of the embodiment of FIGS. 1 through 4, the module 20 was tethered by cords 54 running to the floor at the front of the wind tunnel from locations on the frame side plates corresponding to the center of gravity of the module. The unit was designed to assume a 45° angle as shown in FIG. 1. When so positioned, with the elements 36 also positioned with their flat surfaces at 45° with respect to the vertical, as shown in FIG. 1, the air flow through the ascending leg 42 will be deflected downwardly as it passes the elements 36, approximately into alignment with the elements 36 of the descending leg 44. Thus with this configuration, at low speed, there will be minimal drag interaction between the wind and the elements of the descending leg 44.

However, with efficient airfoil element design and arrangement, more vertical angles increase efficiency of both lift and power generation while still resulting in minimum drag on the descending leg. Power can be generated on the descending leg as well but this produces negative lift and reduces ascending leg power due to air pressure differential reduction. It also will be understood that for such different dispositions the inclination of the airfoil elements 36 relative to the frame 22 must be altered to assure proper angle of attack.

The apparatus of FIGS. 1 through 4 also includes a pair of series-connected electric generators 56, 58 mounted on side plate extensions and driven through flexible bands 60, 62 passing around pulleys 64, 66 secured to the lower shaft 26. In the above-mentioned wind-tunnel test, takeoff to a flying mode occurred at a wind velocity of about 12 knots, and the minimal demonstration power rating was reached at about 18 knots. At that velocity, the airfoil elements 36 moved at a speed producing about two complete round trips per second around the two shafts spaced one foot apart. However, much higher foil velocities, more easily achieved on larger units because of smaller centrefugal force problems for the same foil velocity, are desirable for efficient power generation purposes.

The elongate elements 36 were constructed as flat, rectangular components in order to simplify manufacture of the model for test purposes. It will be understood however that in a commercial structure these elements would be airfoils properly designed to optimize aerodynamic efficiency, for example by employing airfoil sections known to produce good lift at low Reynolds numbers, such as the NACA4415. It is important that all components of the apparatus be as light in weight as possible, consistent with structural requirements. Thus the airfoil elements 36 (see FIG. 6) comprise non-structural inserts 68 which perform the required aerodynamic function but are quite light in weight.

Since a wind-supported power-producing apparatus will at times encounter low or zero wind conditions, the module 20 is designed to assure a slow descent under such conditions, to prevent damage to the structure or other objects on the ground. More specifically, for example, the module 20 may be so designed in the relationship of its aerodynamic center to its lower center of gravity that when it descends under conditions of zero lateral wind velocity, the wing-like elements 36 interact with the air to produce high drag forces. The particular construction illustrated in FIGS. 1 through 4 was designed to descend at a maximum (terminal) velocity of less than 10 miles per hour, which is a sufficiently low speed to prevent damage with only a minimum of cushioning material.

Figure 9:
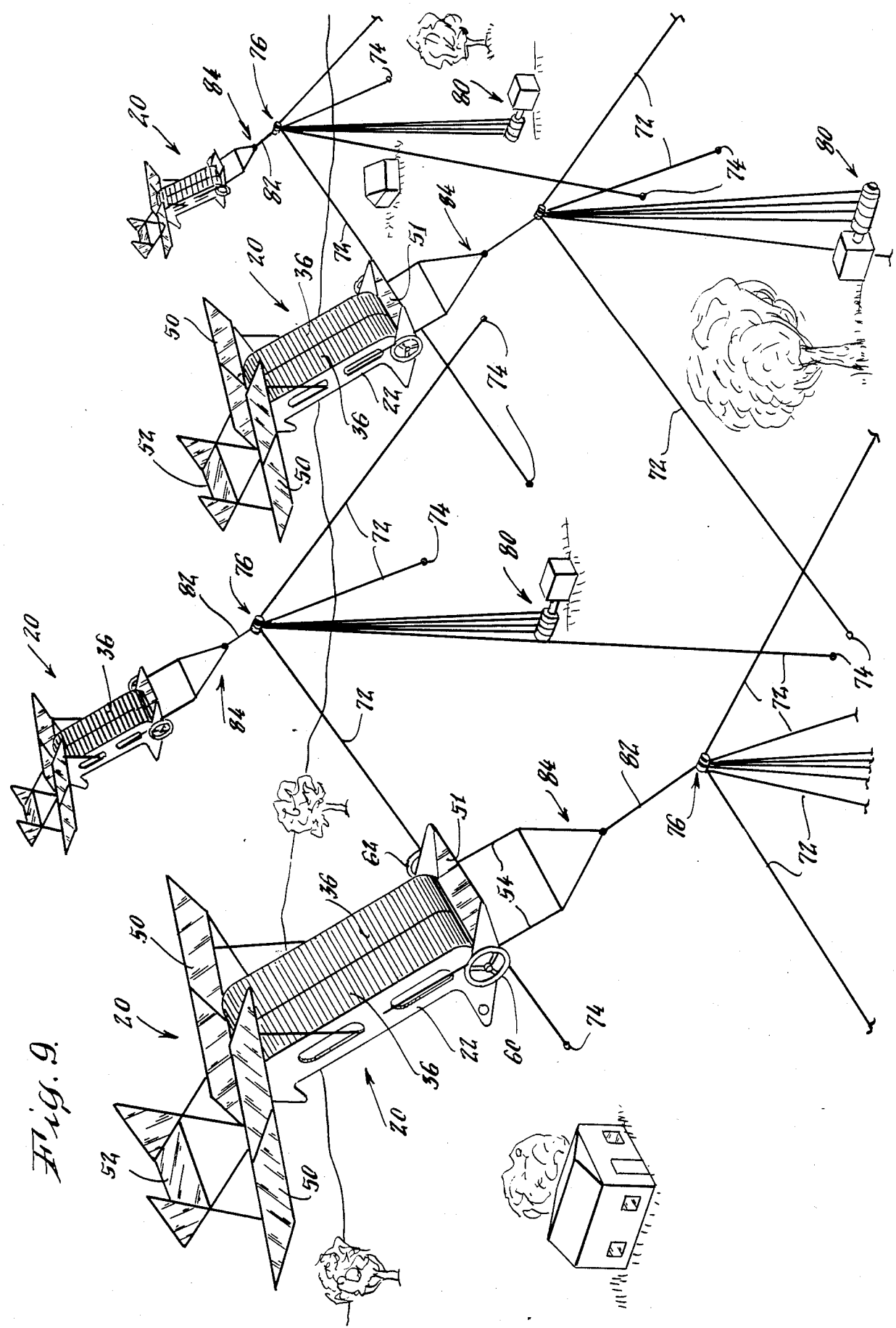
FIG. 9 is a perspective view of a group of wind-operated power-generating modules tethered in fixed positions in the sky.

FIG. 9 shows pictorially an array of wind-operated power-producing modules 20 tethered side-by-side in fixed positions in the sky to extract power from a wide area. Although the relative dimensions indicated in this view are not necessarily to scale, it will be understood that the modules are designed to fly at relatively high altitudes such as up to 1 km. Operation is intended at higher than normal ground level wind speeds, such as 15 mph and above, at times possibly exceeding 60 mph; such velocities would produce high levels of power output for transmittal to earth by power cabling as illustrated at 70.

The fixed-site tethering system shown for each of the modules 20 comprises four separate lines 72 the ends of which are anchored at four widely-separated points 74 on the surface of the earth, e.g. arranged approximately in a square or rectangular configuration. The distances between such anchor points is substantially greater than the dimensions of the modules. The lines 72 extend up from the anchor points to a common junction region 76 where, in the tethering system schematically illustrated herein, they engage corresponding pulleys forming part of a central support member generally indicated at 78 (see also FIG. 11). The lines 72 pass over the pulleys and continue essentially straight down to a set of motor-controlled take-up reels 80 (see also FIG. 10).

Secured to each support member 78 is a single tether line 82 leading to a harness 84 connected to the corresponding module 20. The single line 82 is connected to the member 78 in any convenient fashion permitting the line to swivel about the common region 76, to accommodate shifting movement of the module 20 about that region in response to changes in wind direction. The module is so designed that the aerodynamic forces on it are self-aligning, i.e. those forces cause the modules always to face the wind. The single tether line 82 and the harness 84 preferably have a length just sufficient to permit such swiveling movement while assuring that the modules 20 are held laterally in an essentially single position in the sky, avoiding interference between modules.

Although a four-line tether system is illustrated, it will be understood that the modules 20 can be held in fixed positions in the sky by other arrangements. For example, three-line systems can be used, with the ends of the lines secured to triangularly-related positions on the earth. Likewise, the tethers need not return vertically if take-up reels are located at each of the anchor points. In large systems, the combination of a single tether to each of the modules 20, plus computer coordinated radio control of aerodynamic surfaces such as the tail 52 of each module may be used to keep the array in order.

During conditions of low or zero wind velocity, the modules will descend relatively slowly (for the reasons discussed above) towards their respective take-up reels 80 where they can be retrieved and stowed. The take-up reels will be automatically operated to wind up the tether lines and the electrical cabling. During the descent, the tethering system will prevent the modules from shifting laterally, so that they will descend in an effectively straight line to the respective retrieval point.

Additional modules 20 can if desired also be stacked vertically above those shown in FIG. 9. In such case, means should be provided to stow each module as it arrives at the retrieval point. Advantageously, a module support structure can be provided at the site to receive the last module in the stack and hold it above ground level, for example, 10 feet or so. Thus when the wind freshens this module will lift off and be lofted up towards its design altitude, and lifting the other modules up into the wind stream where they too will develop self-lifting forces.

The modules 20 are lofted to the prescribed altitude by any of various techniques. They may be flown directly up by wind forces, providing that the ground wind velocities are sufficient. Alternative means can be utilized including the use of additional lift devices, either wind-operated or otherwise, to pull the modules up to an altitude where the aerodynamic lift forces on the module are strong enought to carry it the remaining distance. Auxiliary wind-driven lift devices could, if desired, be used not only to pull the modules fully up to the desired altitude but also to aid in holding them there during normal operation. Such devices may for example include a separate wing-like element above the module, connected thereto by flexible cables.

Although particular embodiments of the invention have been described hereinabove in detail, it is desired to emphasize that this has been for the purpose of illustrating the invention and should not be considered as necessarily limitative of the invention, it being understood that many modifications may be made by those skilled in the art while still practicing the invention disclosed herein.

I claim:

1. Apparatus for extracting energy from air currents at high altitude, comprising:
   frame means at said high altitude;
   endless belt means supported by said frame means and arranged for movement around a closed path having an ascending leg and a descending leg;
   a plurality of air-foil elements secured to said endless belt means for movement around said closed path;
   flexible tether means securing said frame means to the surface of the earth;
   said air-foil elements being oriented with respect to said endless belt means so as to apply forces from said air currents to said endless belt means effecting (1) motion of said endless belt means around said path, and (2) a lifting force on said frame means tending to move the frame means up and to apply tension to said tether means; and
   means responsive to the movement of said endless belt means around said path for transmitting power to the surface of the earth.

2. Apparatus as claimed in claim 1, wherein said airfoil elements comprise wing-like elements;
   said wing-like elements being oriented so that those in said ascending leg apply an upward force to said endless belt means, producing movement thereof around said path.

3. Apparatus as claimed in claim 2, wherein said wing-like elements in the descending leg are disposed so as to offer minimum drag resistance.

4. Apparatus as claimed in claim 1, wherein the endless belt movement responsive means comprises an electric generator.

5. Apparatus as claimed in claim 1, wherein aerodynamic surfaces of said apparatus are arranged to produce rotational forces about the vertical tending to align the structure of said apparatus with said wing-like elements extending in a direction perpendicular to the air currents.

6. The method of developing power from the wind at relatively high altitudes comprising
   lofting an apparatus to said high altitude by means of lift from the wind;
   tethering said apparatus at a fixed position in the sky;
   supporting with said apparatus a plurality of airfoil elements positioned side-by-side and arranged for movement in a closed path;
   said elements being perpendicular to said closed path and effectively defining a cylindrical region around said path having its axis parallel to the earth's surface;
   moving said elements by wind interaction at said high altitude; and
   developing an electrical output from the movement of said elements.

7. The method of claim 6, including the step of lowering said apparatus substantially in a direction straight back to earth during periods of low wind velocity; and
   producing a relatively slow descent through interaction between the airfoil elements and the air.

8. Apparatus for converting wind energy at high altitude into power usable at the surface of the earth, comprising:
   lift means at said high altitude responsive to air currents for developing lifting force;
   said lift means comprising a plurality of wing-like airfoil elements arranged for movement about a closed path having an ascending leg and a descending leg;

said elements being driven about said path by said air currents;

power means supported by said lift means for converting energy from air currents at said altitude into power;

flexible tether means comprising a plurality of lines secured to the surface of the earth at spaced locations generally beneath said lift means with said lines extending up from said spaced locations to a common region at or close to said lift means;

means at said common region securing said lines together at a common junction;

means connecting said lift means to said common junction so that said lifting force develops tension in said lines and to provide that said lift means is held in a relatively fixed position both laterally and vertically; and means to transfer energy from said power means to the surface of the earth.

9. Apparatus as claimed in claim 8, wherein said airfoil elements are supported in a horizontal position.

10. Apparatus as claimed in claim 8, wherein said airfoil elements in said ascending leg are disposed so as to deflect the air passing by in a direction which is at least substantially aligned with the airfoil elements in said descending leg.

11. Apparatus as claimed in claim 8, wherein the force of the air currents striking the airfoil elements in said ascending leg provides said lift tending to maintain said apparatus at the desired altitude.

12. Apparatus as claimed in claim 8, wherein said power means comprises means coupled to said airfoil elements to derive power from the movement thereof about said closed path.

13. Apparatus for converting wind energy at high altitude into energy on the surface of the earth, comprising:

a structure at said high altitude;

air-foil means responsive to air currents for establishing a lifting-force holding said structure at said altitude;

means supported by said structure for developing power from air currents to provide for transmission thereof to the ground;

flexible tether means secured to the ground and extending to said structure to hold it in a fixed position with respect to lateral movement; and means operable to reel in said tether means to accommodate downward movement of said structure while maintaining it fixed laterally;

said airfoil means including means arranged to interact with the air during such descent to produce relatively high drag forces in the absence of lateral wind currents, whereby to assure relatively slow descent.

14. Apparatus for converting the movement of air currents at high altitudes into useful energy at the surface of the earth, comprising:

an array of devices at high altitudes with each including airfoil means responsive to wind currents both for developing lifting forces for holding the devices up at such altitudes and for extracting energy therefrom for transmission to ground;

said devices being disposed in a pattern providing lateral separation of all of said devices from one another sufficient to avoid interference therebetween;

tether means arranged to establish for each of said devices an operating zone which is substantially fixed in space laterally to maintain said separation between said devices;

means operable with said airfoil means for developing power from the movement thereof responsive to wind currents; and means for transmitting such power to the surface of the earth.

15. Apparatus as claimed in claim 14, wherein said tether means consists of a plurality of tethers for said devices respectively and arranged to establish for each of said devices a corresponding tether point which is substantially fixed in space with respect to lateral movement; and a flexible line connecting each tether point to the corresponding device;

said connecting means further comprising means to accommodate swiveling movement of said line about its tether point to provide that each device can swing to a down wind position from its tether point in accordance with the wind direction at the altitude of that device.

16. In a system wherein a wind-supported power-producing module is normally fixed in position at a relatively high altitude to extract power from the wind, and wherein the wind is variable such that for certain periods there will be insufficient wind velocity to maintain the module at the required altitude;

the improved method for returning the module to earth at such a period comprising:

operating airfoil elements on the module to interact with the air encountered during descent to produce reactive upward forces tending to hold the module up during descent; and guiding the module during descent along an essentially straight line from said fixed position to the point of retrieval.

17. Apparatus for converting wind energy at high altitude into power usable at the surface of the earth, comprising:

lift means at said high altitude responsive to air currents for developing lifting force;

power means supported by said lift means for converting energy from air currents at said altitude into power;

said power means comprising an electric generator supported by said lift means;

airfoil means comprising a plurality of wing-like elements responsive to air currents and serving to actuate said generator;

endless belt means mounting said wing-like elements in horizontal orientation for movement about a closed path having ascending and descending legs;

said generator being coupled to said endless belt means;

means for transmitting electrical power from said generator to the ground;

flexible tether means comprising a plurality of lines secured to the surface of the earth at spaced locations generally beneath said lift means with said lines extending up from said spaced locations to a common region at or close to said lift means;

means at said common region securing said lines together at a common junction;

means connecting said lift means to said common junction so that said lifting force develops tension in said lines and to provide that aaid lift means is held in a relatively fixed position both laterally and vertically; and means to transfer energy from said power means to the surface of the earth.

18. Apparatus for converting wind energy at high altitude into energy on the surface of the earth, comprising:

a structure at said high altitude;

air-foil means responsive to air currents for establishing a lifting force holding said structure at said altitude;

said air-foil means comprising a plurality of wing-like elements;

endless belt means mounted on said structure for movement about at least one closed path having ascending and descending legs;

said wing-like elements being secured to said endless belt means in parallel, horizontal orientation to develop forces causing motion of said endless belt means about said closed path;

means supported by said structure for developing power from air currents to provide for transmission thereof to the ground;

said means for developing power comprising means driven by movement of said wing-like elements;

flexible tether means secured to the ground and extending to said structure to hold it in a fixed position with respect to lateral movement; and means operable to reel in said tether means to accommodate downward movement of said structure while maintaining it fixed laterally;

said air-foil means interacting with the air during such descent to produce relatively high drag forces in the absence of lateral wind currents, whereby to assure relatively slow descent.

19. Apparatus as claimed in claim 18, wherein said ascending and descending legs of said endless belt means extend between two horizontal axes which are displaced vertically.

20. The method of developing power from the wind at relatively high altitudes comprising:

lofting an apparatus to said high altitude by means of lift from the wind;

tethering said apparatus at a fixed position in the sky;

supporting with said apparatus a plurality of elongate and parallel elements positioned side-by-side around a closed loop extending perpendicularly to the longitudinal axes of said elements and arranged for movement together around said loop;

moving said elements around said closed loop by wind interaction at said high altitude; and developing an electrical output from the movement of said elements.

21. Apparatus for converting wind energy at high altitude into power usable at the surface of the earth, comprising:

lift means at said high altitude responsive to air currents for developing lifting force;

said lift means comprising a module with a plurality of movable airfoil elements;

said airfoil elements being arranged to develop forces to self-align said module in a direction facing the direction of the air currents;

power means supported by said lift means for converting energy from air currents at high altitude into power;

flexible tether means comprising a plurality of flexible lines secured to the surface of the earth at spaced locations generally beneath said lift means with said lines extending up from said spaced locations to a common region at or close to said lift means;

means at said common region securing said lines together at a common junction;

means connecting said lift means to said common junction comprising a single flexible tether line;

said lifting force being transmitted through said single tether line to said common junction to develop tension in said plurality of lines;

said lift means being held in a relatively fixed position both laterally and vertically by all of said flexible lines;

said single flexible line extending from said common junction to said module in a direction having both a lateral and a vertical component with reference to the surface of the earth;

said connecting means further comprising means affording relative rotational movement of said single flexible tether line about a vertical axis through said common junction to provide for shifting movement of said module to effect alignment thereof with the direction of air currents; and means to transfer energy from said power means to the surface of the earth.

* * * * *